US012759321B2

(12) United States Patent
Hara

(10) Patent No.: US 12,759,321 B2
(45) Date of Patent: Oct. 13, 2026

(54) CONVEYING APPARATUS AND RECORDING APPARATUS

(71) Applicant: CANON KABUSHIKI KAISHA, Tokyo (JP)

(72) Inventor: Tomoya Hara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 112 days.

(21) Appl. No.: 18/774,148

(22) Filed: Jul. 16, 2024

(65) Prior Publication Data

US 2025/0033385 A1 Jan. 30, 2025

(30) Foreign Application Priority Data

Jul. 27, 2023 (JP) ................................ 2023-122656

(51) Int. Cl.
*B41J 13/08* (2006.01)
*B41J 13/00* (2006.01)
*B41J 13/03* (2006.01)
*B41J 13/10* (2006.01)

(52) U.S. Cl.
CPC ........... *B41J 13/08* (2013.01); *B41J 13/0018* (2013.01); *B41J 13/0045* (2013.01); *B41J 13/03* (2013.01); *B41J 13/103* (2013.01)

(58) Field of Classification Search
CPC .... B41J 13/08; B41J 13/0018; B41J 13/0045; B41J 13/03; B41J 13/103
See application file for complete search history.

(56) References Cited

U.S. PATENT DOCUMENTS

2010/0073700 A1* 3/2010 Uematsu ................ B41J 13/103 358/1.13

FOREIGN PATENT DOCUMENTS

JP 2007-145466 A 6/2007
JP 2011136827 A * 7/2011 ............ B65H 1/266

* cited by examiner

*Primary Examiner* — Julian D Huffman
(74) *Attorney, Agent, or Firm* — Venable LLP

(57) ABSTRACT

In a conveyance path including a curved portion, a pair of first intermediate rollers and a second intermediate roller facing an outer inside wall with a gap therebetween are provided. A recording medium is conveyed by the pair of first intermediate rollers and the second intermediate roller while a conveying roller provided downstream of the pair of first intermediate rollers is rotated in the reverse direction, thereby performing skew correction. When passing through the curved portion, the recording medium comes into contact with the second intermediate roller, whereby the recording medium is subject to a conveying force from the second intermediate roller and the pair of first intermediate rollers. This limits conveyance failures. Since only the pair of first intermediate rollers convey the recording medium by nipping it, a skew correction of the recording medium is not hindered.

11 Claims, 18 Drawing Sheets

CONVEYING APPARATUS AND RECORDING APPARATUS

BACKGROUND OF THE INVENTION

Field of the Invention

The present invention relates to a conveying apparatus that conveys a recording sheet to a recording portion, and a recording apparatus that uses the conveying apparatus.

Description of the Related Art

A recording apparatus that records image data onto a recording medium has a feeding device, which feeds recording media by separating the media one by one toward the recording portion from the storage storing stacked recording media. A recording medium sent out from the storage by the feeding device is conveyed to the recording portion through a conveyance path by a conveying apparatus including a conveying roller. In such a recording apparatus, the apparatus body can be downsized by providing the storage of recording media below the recording portion. In a configuration in which the storage is provided below the recording portion, the conveyance path includes a curved portion curved in a U-shape in order to convey the recording medium sent out from the storage toward the recording portion. When a recording medium made of a highly rigid material is used, the recording medium receives a strong reaction force from the conveyance path while passing through the curved portion of the conveyance path. As such, a weak conveying force may cause conveyance failures such as buckling or jamming of the recording medium.

Japanese Patent Application Laid-Open No. 2007-145466 discloses a configuration in which a conveying force is applied by nipping a recording medium between a conveying roller and a pressure roller at multiple points in a curved portion of a conveyance path. This provides a large conveying force, thereby limiting conveyance failures.

There are recording apparatuses that correct a skew of a recording medium before performing a recording operation on the recording medium. To correct a skew, the recording medium needs to be warped in a direction perpendicular to the recording surface. When the recording medium is nipped between the conveying roller and the pressure roller at multiple locations, the movement of the recording medium may be hindered, resulting in insufficient skew correction. Japanese Patent Application Laid-Open No. 2007-145466 describes a configuration in which a separation mechanism is provided on a conveying roller, allowing the recording medium to be brought into a state in which the recording medium is not nipped between the conveying roller and the pressure roller. By using the separation mechanism to bring the recording medium into a state in which the recording medium is not nipped between the conveying roller and the pressure roller during a skew correction operation, the rotation of the recording medium is not hindered. This allows the skew correction operation to be appropriately performed. However, providing the separation mechanism complicates the apparatus, and the separation operation may degrade the productivity of the recording apparatus.

SUMMARY OF THE INVENTION

In a recording apparatus having a recording medium conveyance path that is partly curved, the present invention achieves both appropriate skew correction and reduced conveyance failures with a simple configuration.

One aspect of the present invention is directed to a recording apparatus comprising:

a feeding unit configured to feed a recording medium;

a recording unit configured to record an image on the recording medium;

a conveyance path including a curved portion formed by an inner inside wall having a convex shape in a first direction and an outer inside wall spaced apart from the inner inside wall in the first direction and having a concave shape, the conveyance path being configured to guide the recording medium fed by the feeding unit to the recording unit;

a first conveyor provided in the conveyance path and including a first driving roller configured to be driven by a driving source and a driven roller configured to nip the recording medium together with the first driving roller, and a second conveyor including a second driving roller provided on the inner inside wall of the curved portion upstream of the first driving roller in a conveying direction and configured to be driven by a driving source, wherein the second driving roller faces the outer inside wall in the first direction with a gap between them.

Further features of the present invention will become apparent from the following description of exemplary embodiments with reference to the attached drawings.

DESCRIPTION OF THE EMBODIMENTS

Figure 1:
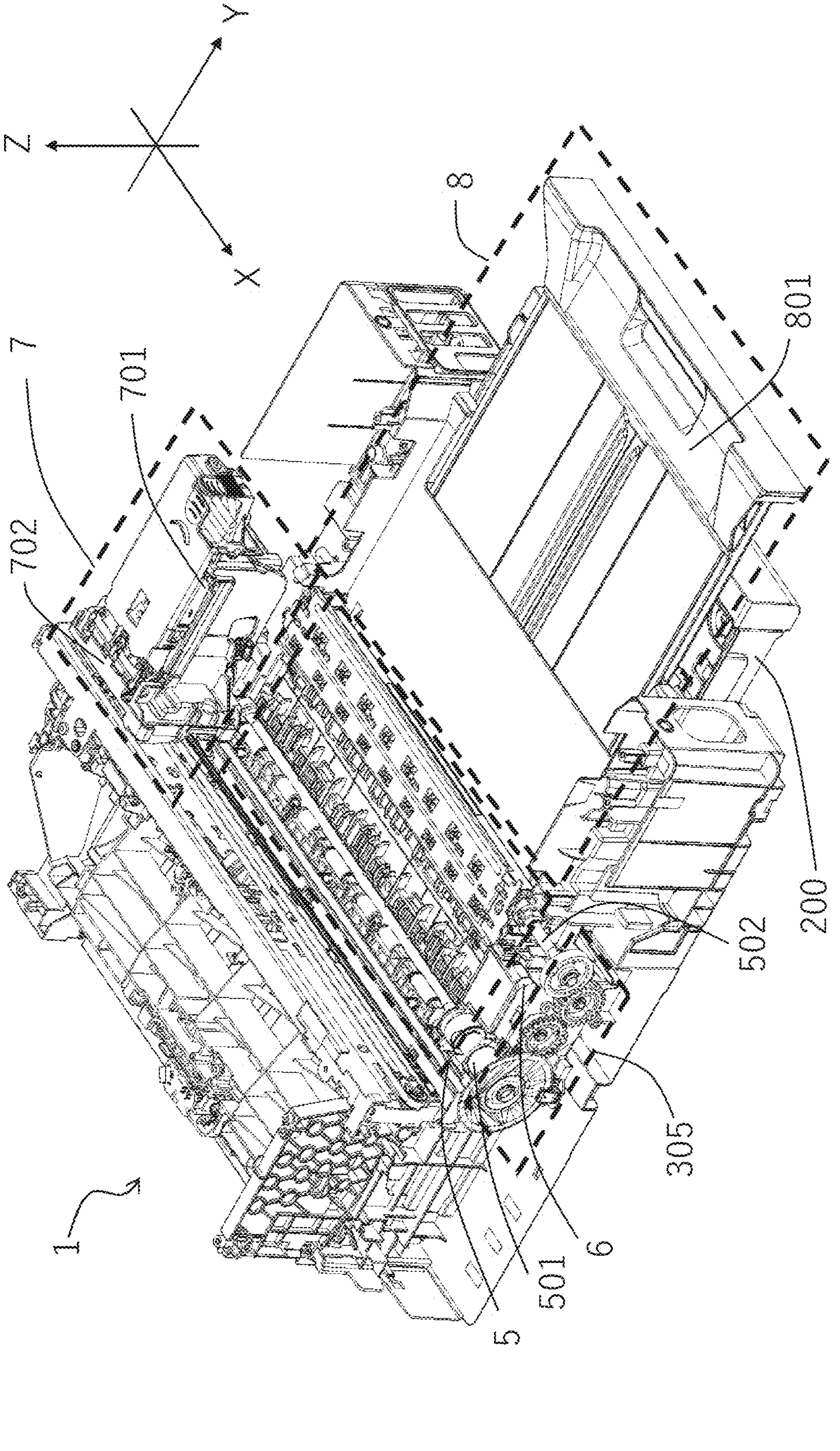
FIG. 1 is a perspective view showing the internal structure of a recording apparatus according to an embodiment.

Referring to the accompanying drawings, an embodiment is now described in detail. It should be noted that the following embodiment is not intended to limit the present invention. Although the embodiment is described with various features, not all of these features are essential to the invention, and the features may be combined in any manner. Furthermore, in the accompanying drawings, the same reference numerals are given to the same or similar components, and the overlapping portions are not described.

The terms “record” and “print” as used herein encompass, in addition to the formation of significant information such as characters and figures, the formation of images, patterns, and the like on a recording medium and the processing of a medium in a broad sense, regardless whether the information is significant or insignificant, and regardless of whether the information is manifested in a manner that is visually perceivable by a human.

Also, the terms “recording medium” and “paper” encompass not only recording paper used for common image forming apparatuses, but also sheet-shaped media that can be conveyed in a broad sense, such as cloth, plastic film (OHP), metal plates, glass, ceramics, wood, and leather.

The recording apparatus according to the present invention may be used as an image forming apparatus having the functions of a printer, copier, facsimile machine, and the like, or as an output device for image data in a multi-function electronic device or a workstation including a computer, word processor, and the like.

First Embodiment

An outline of an inkjet recording apparatus of a first embodiment is now described. In the following description, the scanning direction of the recording head is defined as the X direction (second direction), the direction intersecting the X direction and the vertical direction is defined as the Y direction, and the vertical direction is defined as the Z direction. The X direction is also the width direction of the recording medium and the width direction of the recording apparatus. The Y direction is also the depth direction of the recording apparatus and the horizontal component of the conveying direction of the recording medium.

Overall Composition

Figure 2:
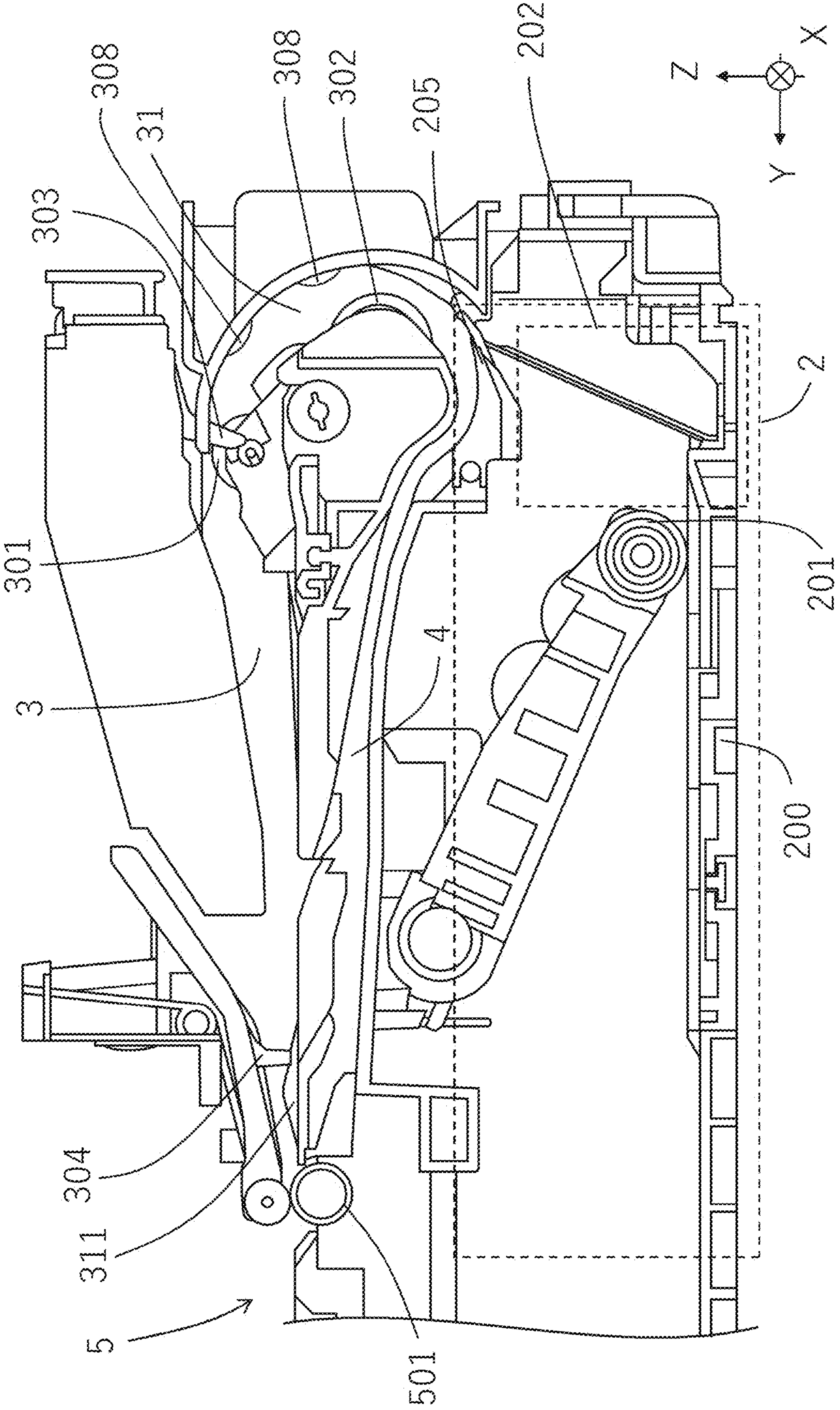
FIG. 2 is a cross-sectional view showing a feeding portion and a conveyance portion of the recording apparatus.

FIG. 1 is a perspective view showing the internal structure of a recording apparatus 1 according to the first embodiment. FIG. 2 is a cross-sectional view of a feeding unit 2, a conveyance path 3, and a conveyance portion 5 of the recording apparatus 1 shown in FIG. 1, taken along a cross-section perpendicular to the X direction. The recording apparatus 1 performs recording on a recording medium P. The recording apparatus 1 is a serial inkjet recording apparatus, which ejects ink onto a recording medium P to perform recording. The recording apparatus 1 includes a feeding unit 2, a conveyance path 3, a conveyance portion 5, a drive motor 6, a recording unit 7, and a discharge portion 8.

The feeding unit 2 and the conveyance portion 5 convey the recording medium P. The feeding unit 2 includes a cassette 200, a pickup roller 201, a separation portion 202, and a feeding flapper 205. The conveyance portion 5 includes a conveying roller 501 and a discharge roller 502. The conveyance path 3 is located between the feeding unit 2 and the conveyance portion 5, and guides the recording medium P fed from the feeding unit 2 through the conveyance portion 5 to the recording unit 7. The conveyance path 3 includes a pair of intermediate rollers 301, an intermediate roller 302, an end detection lever 303, an end detection lever 304, and a double-sided flapper 311. Details of the conveyance path 3 will be described below.

The cassette 200 is a storage capable of storing a plurality of recording media P in a stacked manner. The cassette 200 is provided in the lower part of the housing of the recording apparatus 1. The pickup roller 201 is a feeding unit configured to feed a recording medium P stored in the cassette 200. The recording medium P stacked in the cassette 200 is fed by the pickup roller 201 of the feeding unit 2, conveyed along the conveyance path 3, and conveyed to the recording unit 7 by the intermediate roller 302, the pair of intermediate rollers 301, and the conveying roller 501.

The recording unit 7 is a recording unit configured to record an image on the recording medium P that has been conveyed. The recording unit 7 includes a recording head 701, which can eject ink, and a carriage 702, which can reciprocate in scanning directions (width directions of the recording medium P intersecting the conveying direction) carrying the recording head 701. The recording head 701 is moved by the carriage 702 in the scanning directions, so that printing can be performed at any position in the width direction of the recording medium P.

For single-sided recording, the recording medium P on which recording is performed in the recording unit 7 is discharged from the discharge portion 8. For double-sided recording, the recording medium P on which recording is performed in the recording unit 7 is conveyed by the discharge roller 502 and the conveying roller 501 to pass under the double-sided flapper 311 and through the double-sided conveyance path 4 and the conveyance path 3, and then returned to the conveyance portion 5. Then, the recording unit 7 performs recording on the back side, and the recording medium P is discharged from the discharge portion 8. The discharge portion 8 includes a discharge tray 801. The recording medium P on which the recording is performed in the recording unit 7 is discharged onto the discharge tray 801 by the discharge roller 502 of the conveyance portion 5.

Conveyance Passage

Figure 3:
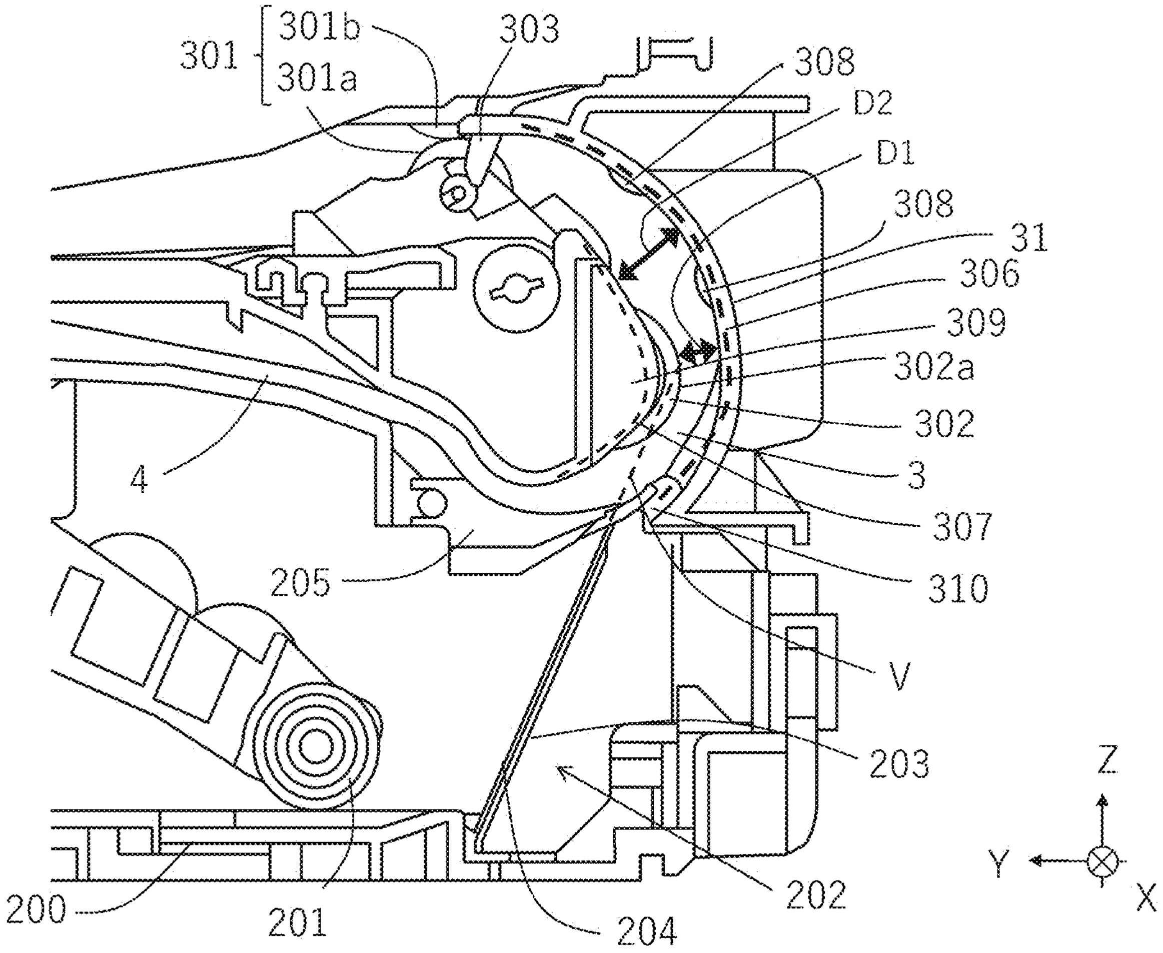
FIG. 3 is a cross-sectional view of a conveyance path.
Figure 4:
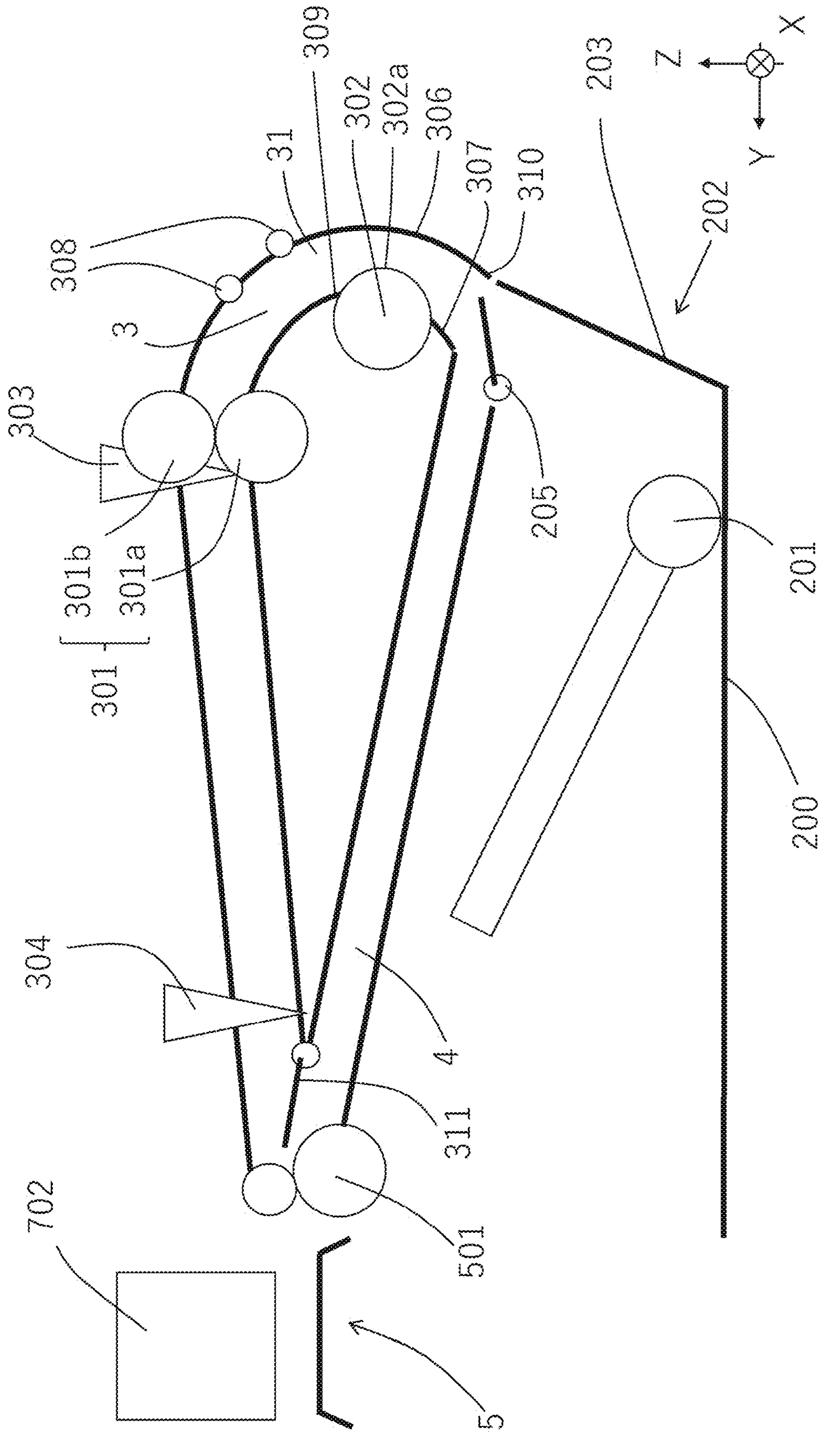
FIG. 4 is a schematic view of the conveyance path.

FIG. 3 is an enlarged cross-sectional view of a part of the conveyance path 3 taken along a cross-section perpendicular to the X direction. FIG. 4 is a conceptual diagram of the conveyance path 3. The recording medium P stacked in the cassette 200 below the recording unit 7 is conveyed to the conveyance portion 5 after passing through the conveyance path 3. The conveyance path 3 guides the recording medium P from the cassette 200, which is installed horizontally in the lower part of the recording apparatus 1, to the recording unit 7, which is located in the upper part of the recording apparatus 1. The conveyance path 3 has a curved portion 31 substantially curved in a U-shape. The cassette 200 and the recording unit 7 are connected by the conveyance path 3 including the curved portion 31, so that the cassette 200 and the recording unit 7 can be placed one above the other. This is effective in reducing the size of the recording apparatus 1.

The curved portion 31 is formed by an inner inside wall 307 and an outer inside wall 306. The inner inside wall 307 has a convex shape in the −Y direction (first direction), and the outer inside wall 306 is spaced apart from the inner inside wall 307 in the −Y direction (first direction) and has a concave shape. When the recording medium P passes through the curved portion 31 of the conveyance path 3, a part of the recording medium P comes into contact with the outer inside wall 306 or the inner inside wall 307 of the curved portion 31 of the conveyance path 3, and thus the recording medium P assumes a curved shape. Multiple rotating members 308, which are second driven rollers that are not driven by a driving source, are provided downstream in the conveying direction of the position of the outer inside wall 306 that faces the intermediate roller 302. When the recording medium P moves along the outer inside wall 306, the rotating members 308 rotate following the recording medium P, reducing the friction force acting on the recording medium P.

The drive motor 6 transmits its driving force to the conveying roller 501, the discharge roller 502, the pair of intermediate rollers 301, the intermediate roller 302, and the pickup roller 201 via a gear train 305.

In the following description, the side corresponding to the feeding unit 2 is referred to as upstream in the conveying direction, and the side corresponding to the discharge portion 8 is referred to as downstream in the conveying direction. The rotation of the drive motor 6 that causes the conveying roller 501 to convey the recording medium P downstream in the conveying direction is referred to as forward rotation (rotation in the forward direction). The rotation of the drive motor 6 that causes the conveying roller 501 to convey the recording medium P upstream in the conveying direction is referred to as reverse rotation (rotation in the reverse direction). According to the rotation direction of the drive motor 6, the conveying roller 501 and the discharge roller 502 can convey the recording medium P both upstream and downstream in the conveying directions. The pair of intermediate rollers 301 and the intermediate roller 302 are operated by a mechanism within a drive train (not shown) to convey the recording medium P downstream in the conveying direction regardless of whether the drive motor 6 is driven in the forward or reverse direction.

The pickup roller 201 is connected to the drive motor 6 via a drive switching portion (not shown). Forward rotation of the drive motor 6 causes the pickup roller 201 to convey the recording medium P downstream in the conveying direction only when the drive switching portion connects the drive. As such, during operations other than the feeding operation, the recording medium P stacked in the cassette 200 is not fed. The drive switching operation is performed according to a combination of the operations of the carriage 702 and the drive motor 6. Although an example in which the pickup roller 201 is driven by the drive motor 6 has been described, a configuration having a separate drive motor for driving the pickup roller 201 may also be used.

When the drive switching portion connects the drive to the pickup roller 201, the pickup roller 201 feeds the recording medium P stacked in the cassette 200 toward the conveyance path 3. The separation portion 202 is provided upstream of the conveyance path 3. The curved portion 31 of the conveyance path 3 is located above the cassette 200. The separation portion 202 has a separation slope 203, which extends from the end of the cassette 200 on the −Y direction side toward the conveyance path 3, and a separation resistive element 204 provided on the separation slope 203. The separation slope 203 connects the upstream end of the curved portion 31 and the cassette 200 and is inclined along the −Y direction. The separation resistive element 204 applies resistance to the recording medium P passing on the separation slope 203. This limits multiple feed incidents in which the pickup roller 201 simultaneously feeds multiple sheets due to friction or adhesion between the recording media P, and allows only the uppermost recording medium P stacked in the cassette 200 to be fed.

The conveyance path 3 includes the pair of intermediate rollers 301, the intermediate roller 302, the end detection lever 303, and the end detection lever 304. The pair of intermediate rollers 301 includes a driving roller 301*a*, which is a first driving roller that rotates by receiving a driving force from the drive motor 6 as the driving source, and a driven roller 301*b*, which rotates by coming into contact with the driving roller 301*a* and is not driven by a driving source. The driving roller 301*a* receives an elastic force from a compression spring (not shown) in the direction toward the driven roller 301*b*. The pair of intermediate rollers 301 is a first conveyor provided downstream of the curved portion 31 in the conveying direction in the conveyance path 3, and applies a conveying force by nipping the recording medium P. The pair of intermediate rollers 301 is located at the downstream end of the substantially U-shaped curved portion 31 of the conveyance path 3, and the portion of the conveyance path 3 from the pair of intermediate rollers 301 to the conveying roller 501 is linear.

The intermediate roller 302 is a second driving roller, which is provided at the inner inside wall 307 of the curved portion 31 upstream of the pair of intermediate rollers 301 in the conveying direction, and is driven by the drive motor 6 as the driving source. The intermediate roller 302 faces the outer inside wall 306 with a gap in between in the first direction (Y direction). The intermediate roller 302 is a second conveyor, which applies a conveying force by coming into contact with the recording medium. The intermediate roller 302 is a driving roller that is rotated by the driving force transmitted from the drive motor 6. There is no driven roller at the position facing the intermediate roller 302. When the recording medium P passes through the location of the conveyance path 3 where the intermediate roller 302 is provided, it is not nipped between a driving roller and a driven roller, unlike when it passes through the pair of intermediate rollers 301. The intermediate roller 302 is provided on the side of the curved portion 31 of the conveyance path 3 corresponding to the inner inside wall 307 such that a space is secured between the outer circumference surface of the intermediate roller 302 and the outer inside wall 306. There is no member that applies an elastic force to the intermediate roller 302 toward the outer inside wall 306. As such, when the recording medium P passes the intermediate roller 302, it is not nipped between the intermediate roller 302 and the outer inside wall 306. When the recording medium P passes the intermediate roller 302, a space is maintained between the recording medium P and the outer inside wall 306 on the opposite side of the recording medium P from the intermediate roller 302. Both the inner inside wall 307 and the outer inside wall 306 of the curved portion 31 have a convex shape in the −Y direction. The end portion 302*a* that is farthest in the −Y direction on the outer circumference surface of the intermediate roller 302 facing the outer inside wall 306 is farther in the −Y direction (towards the outer inside wall 306) than the end portion 309 of the inner inside wall 307 in the −Y direction. The outer circumference surface of the intermediate roller 302 is made of a material having a high coefficient of friction, such as rubber. As a result, even if the normal force acting on the outer circumference surface of the intermediate roller 302 is small due to the rigidity of the recording medium P, a sufficient conveying force can be obtained due to the friction force.

The end detection lever 303 for detecting an end of the recording medium P is provided downstream of the pair of intermediate rollers 301 in the conveying direction. Also, the end detection lever 304 is provided near the downstream end of the linear conveyance path extending downstream of the pair of intermediate rollers 301. The recording medium P rotates the end detection levers 303 and 304, and the positions of the leading and trailing ends of the recording medium P are thus detected. The method for detecting the ends of the recording medium P is not limited to a mechanical detection method such as the end detection levers 303 and 304, and may be an optical detection method using a photosensor or the like.

The behavior of the recording medium P passing through the conveyance path 3 is now described. FIGS. 5A to 5E are cross-sectional views taken along a cross-section perpendicular to the X direction, showing a behavior of the recording medium P passing through the conveyance path 3.

Figure 5A:
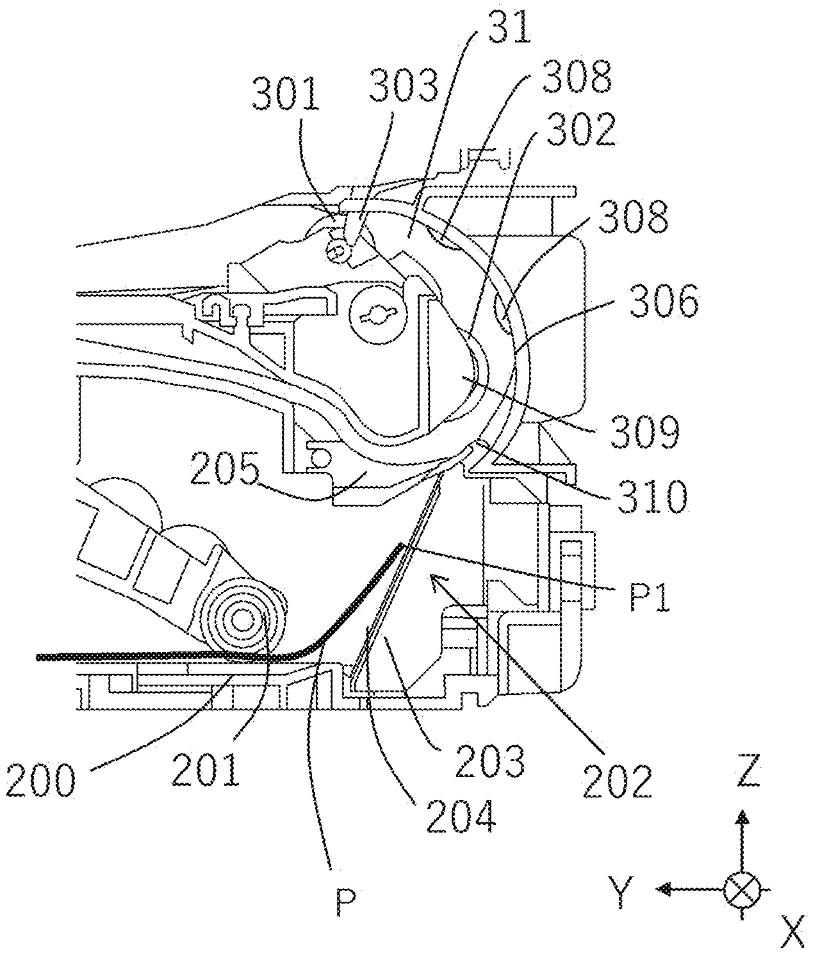
FIG. 5A is a cross-sectional view showing a behavior of a recording medium passing through the conveyance path.

As shown in FIG. 5A, the pickup roller 201 feeds a recording medium P stacked in the cassette 200 to the separation slope 203 of the separation portion 202.

Figure 5B:
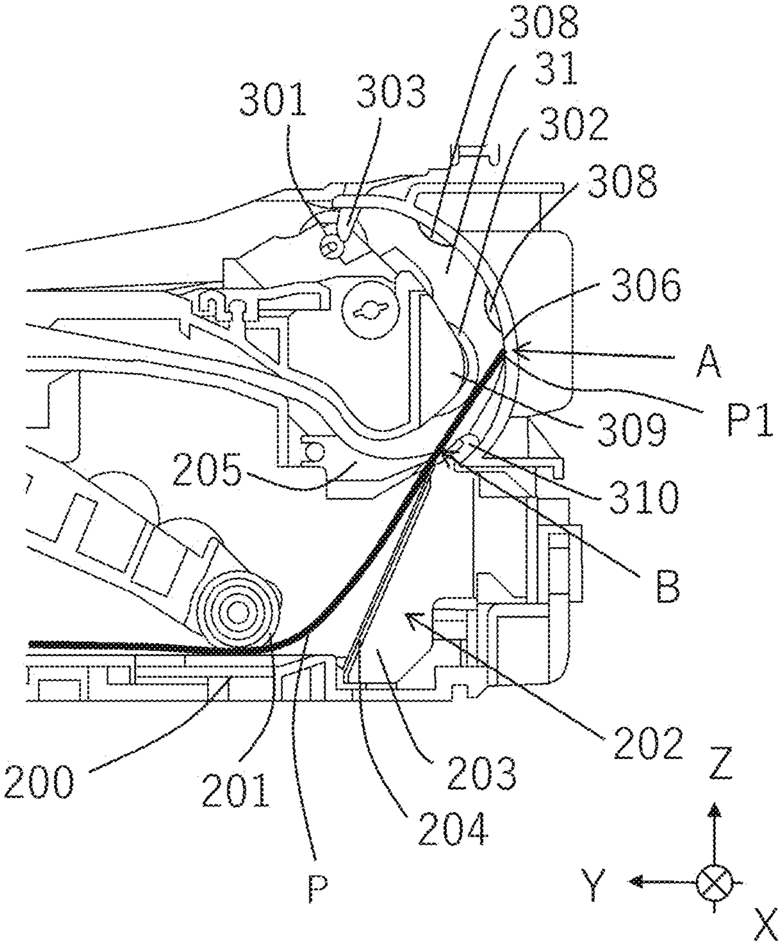
FIG. 5B is a cross-sectional view showing a behavior of the recording medium passing through the conveyance path.

As shown in FIG. 5B, after passing the separation portion 202, the leading end of the recording medium P lifts and passes the feeding flapper 205 and then reaches the outer inside wall 306 of the conveyance path 3.

Figure 5C:
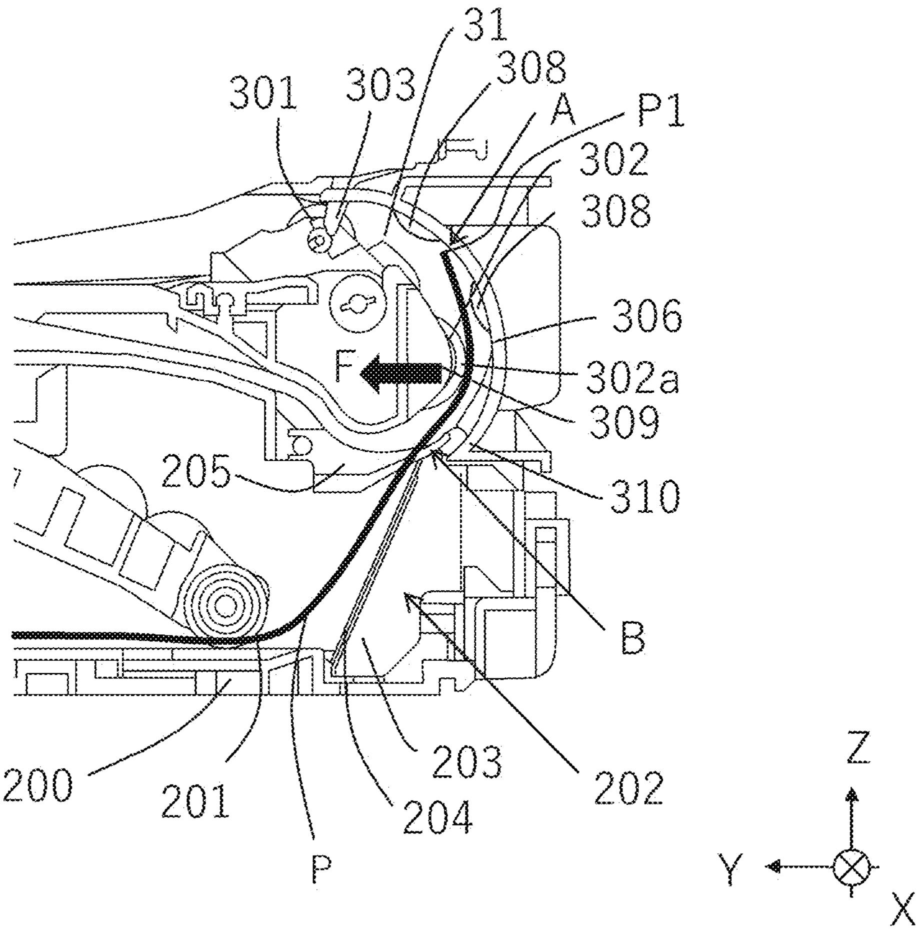
FIG. 5C is a cross-sectional view showing a behavior of the recording medium passing through the conveyance path.

As shown in FIG. 5C, the recording medium P advances along the conveyance path 3 while curving along the outer inside wall 306, but does not assume the same shape as the outer inside wall 306. Due to its rigidity, the recording medium P has a tendency to maintain a linear state even when it is in contact with the outer inside wall 306 and receives a force from the outer inside wall 306. For this reason, as the leading end of the recording medium P advances along the outer inside wall 306 of the curved portion 31, the middle portion of the recording medium P approaches the inner inside wall 307 of the conveyance path 3, comes into contact with the intermediate roller 302, and exerts a normal force in the Y direction indicated by arrow F on the intermediate roller 302. Thus, the recording medium P receives a friction force from the outer circumference surface of the intermediate roller 302 and therefore obtains a conveying force also from the intermediate roller 302. As a result, the recording medium P receives a conveying force by the pickup roller 201 and a conveying force by the intermediate roller 302. The recording medium P receives resistance from the outer inside wall 306 when the leading end comes into contact with the outer inside wall 306. However, the conveying force received from the pickup roller 201 and the intermediate roller 302 allows the conveying force to be greater than the resistance. As such, while the traveling direction of the recording medium P is bent by the resistance from the outer inside wall 306 causing the recording medium P to curve, it is possible to limit conveyance failures, which would otherwise occur if the resistance surpasses the conveying force.

Figure 5D:
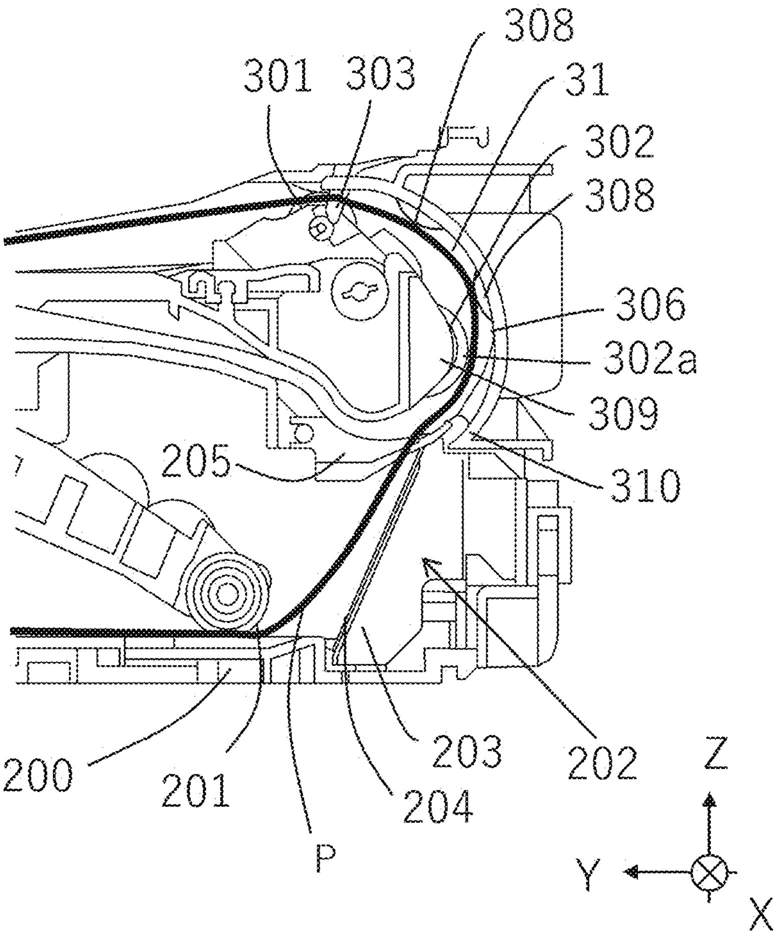
FIG. 5D is a cross-sectional view showing a behavior of the recording medium passing through the conveyance path.

As shown in FIG. 5D, when the leading end of the recording medium P reaches the pair of intermediate rollers 301, the recording medium P is nipped and conveyed by the intermediate rollers 301, and the leading end is detected by the end detection levers 303 and 304. Then, the recording medium P is conveyed to the conveying roller 501. At this time, the double-sided flapper 311 receives an upward elastic force from a spring (not shown), and the leading end of the recording medium P reaches the conveying roller 501 while pressing down the double-sided flapper 311. The conveying roller 501 is a third conveyor provided downstream of the pair of intermediate rollers 301, which is the first conveyor in the conveyance path 3.

The intermediate roller 302 and the conveyance path 3 are now described in detail. The intermediate roller 302 is located upstream of the pair of intermediate rollers 301 in the conveying direction. While being conveyed by the pickup roller 201, the recording medium P receives a reaction force due to the resistance from the separation slope 203 and the outer inside wall 306 of the curved portion 31 of the conveyance path 3. The intermediate roller 302 is located upstream of the pair of intermediate rollers 301 in the conveying direction. As such, when the leading end of the recording medium P reaches the intermediate roller 302, the intermediate roller 302 can apply a conveying force to the recording medium P moving through the region in which the resistance of the separation slope 203 and the outer inside wall 306 are large, so as to assist the pickup roller 201.

FIGS. 5B and 5C illustrate contact point A between the leading end P1 of the recording medium P and the outer inside wall 306, and contact point B between the middle portion of the recording medium P and the starting point 310 of the curved portion 31 (the border between the separation portion 202 and the curved portion 31). When the recording medium P has high rigidity, the recording medium P has a tendency to maintain a linear shape between contact point A and contact point B while being conveyed in the curved portion 31. Here, since the intermediate roller 302 is located on the side of the curved portion 31 corresponding to the inner inside wall 307, when the recording medium P advances through the curved portion 31 while being inclined to maintain a linear shape between contact point A and contact point B, the middle portion of the recording medium P approaches the end portion 309 of the inner inside wall 307 of the curved portion 31. The intermediate roller 302 is provided at the end portion 309 in the −Y direction of the inner inside wall 307 of the curved portion 31. As shown in FIG. 3, the end portion 302*a* on the −Y direction side of the outer circumference surface of the intermediate roller 302 is located closer to the outer inside wall 306 than the end portion 309 on the −Y direction side of the inner inside wall 307. This allows the recording medium P to come into contact with the outer circumference surface of the intermediate roller 302 and thus obtain a conveying force.

As shown in FIG. 3, the intermediate roller 302 is provided so as to intersect an imaginary plane V that is an imaginary extension of the separation slope 203 extending to the inside of the curved portion 31. In other words, at least a part of the intermediate roller 302 is on the side of the imaginary plane V corresponding to the outer inside wall 306. Here, the orientation of the recording medium P passing through the conveyance path 3 is substantially shaped along the separation slope 203 at a position immediately downstream of the downstream end of the separation slope 203 in the conveying direction. As such, when the intermediate roller 302 is located at a position intersecting the imaginary plane V of the separation slope 203, the recording medium P actively comes into contact with the intermediate roller 302, thereby efficiently obtaining a conveying force.

The rotating members 308 are placed downstream of the intermediate roller 302 in the conveying direction. Since the conveyance path 3 has a curved shape at the curved portion 31, the recording medium P can actively come into contact with the intermediate roller 302 when passing through the curved portion 31. However, this increases the resistance applied to the recording medium P at the point of contact with the inside wall surface of the conveyance path 3. Placing the rotating members 308 downstream of the intermediate roller 302 where the curve is steeper reduces the resistance applied to the recording medium P from the conveyance path 3.

As shown in FIG. 3, the distance D1 between the outer circumference surface of the intermediate roller 302 and the outer inside wall 306 of the conveyance path 3 facing the intermediate roller is smaller than the distance D2 between the outer inside wall 306 and the inner inside wall 307 of the conveyance path 3. Due to this configuration, the curved recording medium P has an increased area of contact with the intermediate roller 302 and reduced areas of contact with the outer inside wall 306 and the inner inside wall 307. Consequently, the resistance from conveyance path 3 is reduced, and a conveying force is efficiently obtained.

Double-Sided Conveyance Passage

The behavior of the recording medium P passing through the double-sided conveyance path 4 is now described. FIGS. 6A to 6D are cross-sectional views taken along a cross-section perpendicular to the X direction, showing a behavior of the recording medium P passing through the double-sided conveyance path 4.

Figure 6A:
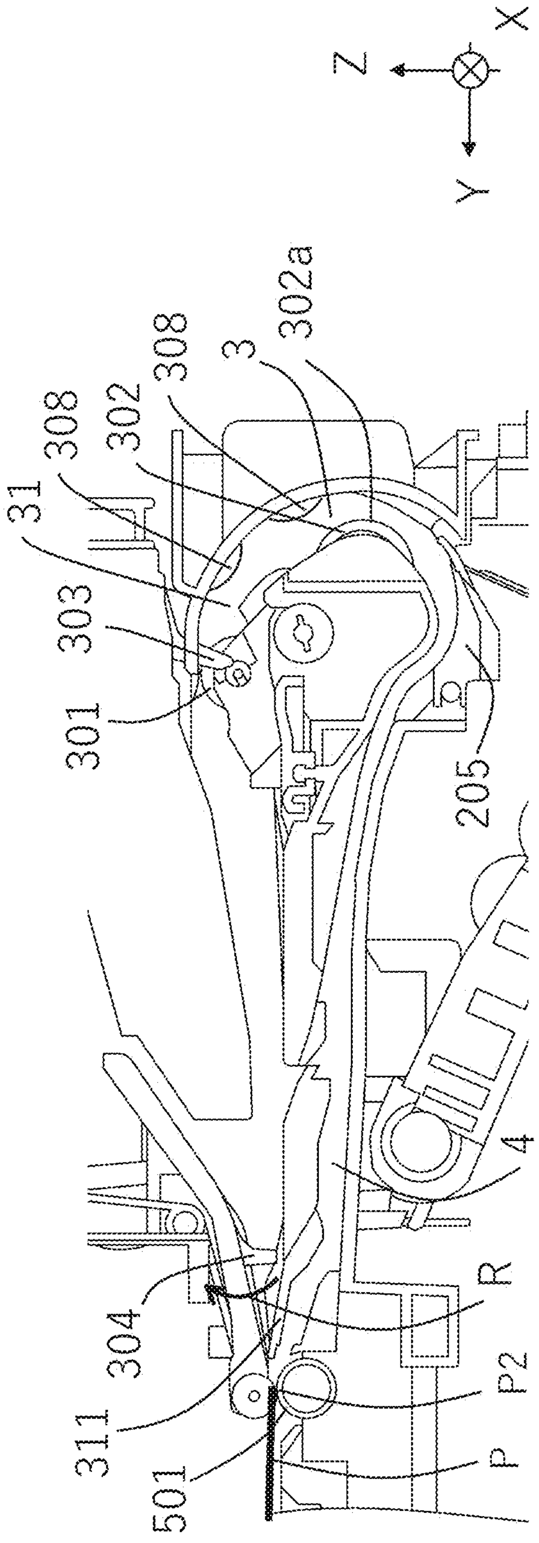
FIG. 6A is a cross-sectional view showing a behavior of a recording medium passing through a double-sided conveyance path.

The position of the trailing end P2 of the front side of the recording medium P at the completion of recording operation on the front side varies depending on the size of the recording medium P and the size of the image in the recording operation. When the trailing end P2 of the front side of the recording medium P is located in the conveyance path 3 (upstream of the conveying roller 501) at the completion of recording operation, the conveying roller 501 is rotated in the forward direction. In contrast, when the trailing end P2 of the front side of the recording medium P is located within the conveyance portion 5 (downstream of the conveying roller 501) at the completion of recording operation, the discharge roller 502 is rotated in the reverse direction. As shown in FIG. 6A, this results in the recording medium P being conveyed in the reverse direction until the trailing end P2 of the front side of the recording medium P reaches a position where it is nipped by the conveying roller 501.

Then, the conveying roller 501 is rotated in the reverse direction to pull the recording medium P into the double-sided conveyance path 4. The double-sided conveyance path 4 is a second conveyance path that conveys the recording medium P for recording on the back side of the recording medium P on which recording on the front side is completed in the recording unit 7. The double-sided conveyance path 4 is connected to the upstream end of the curved portion 31. The trailing end P2 of the front side (leading end of the back side) of the recording medium P is guided by the lower surface of the double-sided flapper 311 and conveyed to the double-sided conveyance path 4. The double-sided flapper 311, which receives the elastic force of a spring (not shown) in the upward direction (+Z direction), rotates in the direction of arrow R in FIG. 6A when the trailing end P2 of the front side of the recording medium P on which recording on the front side is completed reaches the position where it is nipped by the conveying roller 501. The double-sided flapper 311 can thus guide the recording medium P to the double-sided conveyance path 4.

Figure 6B:
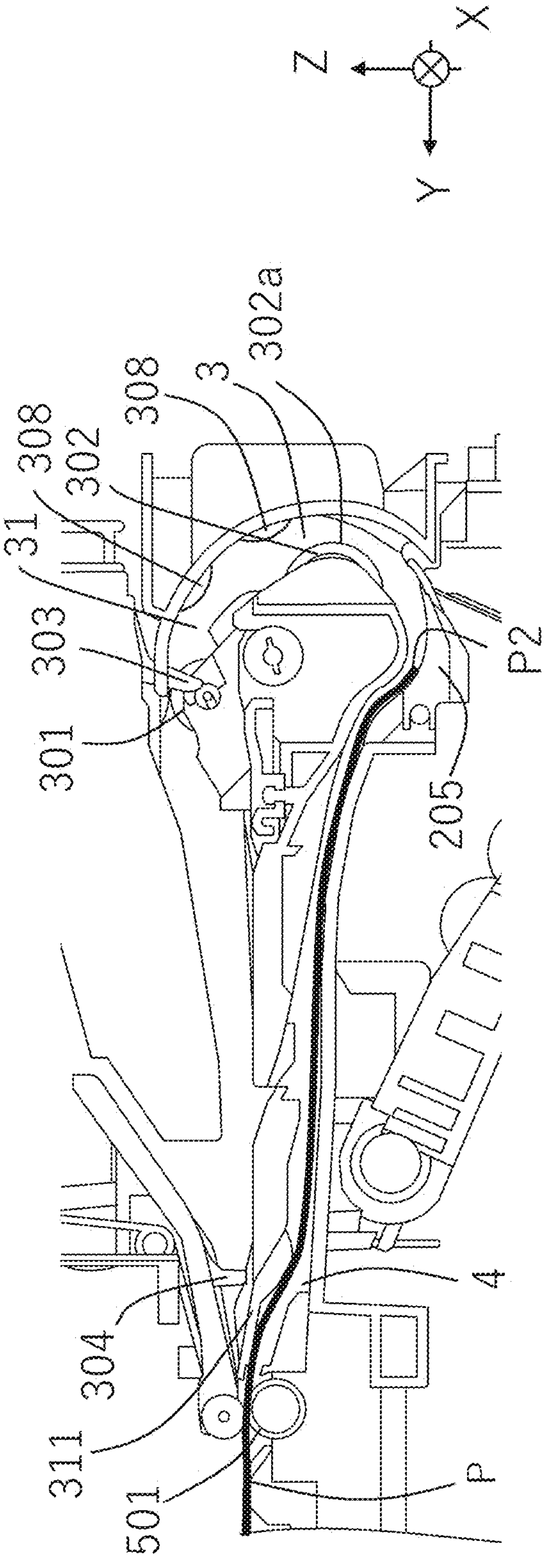
FIG. 6B is a cross-sectional view showing a behavior of the recording medium passing through the double-sided conveyance path.

As shown in FIG. 6B, when the trailing end P2 of the front side (leading end of the back side) of the recording medium P reaches the feeding flapper 205, the recording medium P is guided by the upper surface of the feeding flapper 205 and conveyed to the conveyance path 3.

Figure 6C:
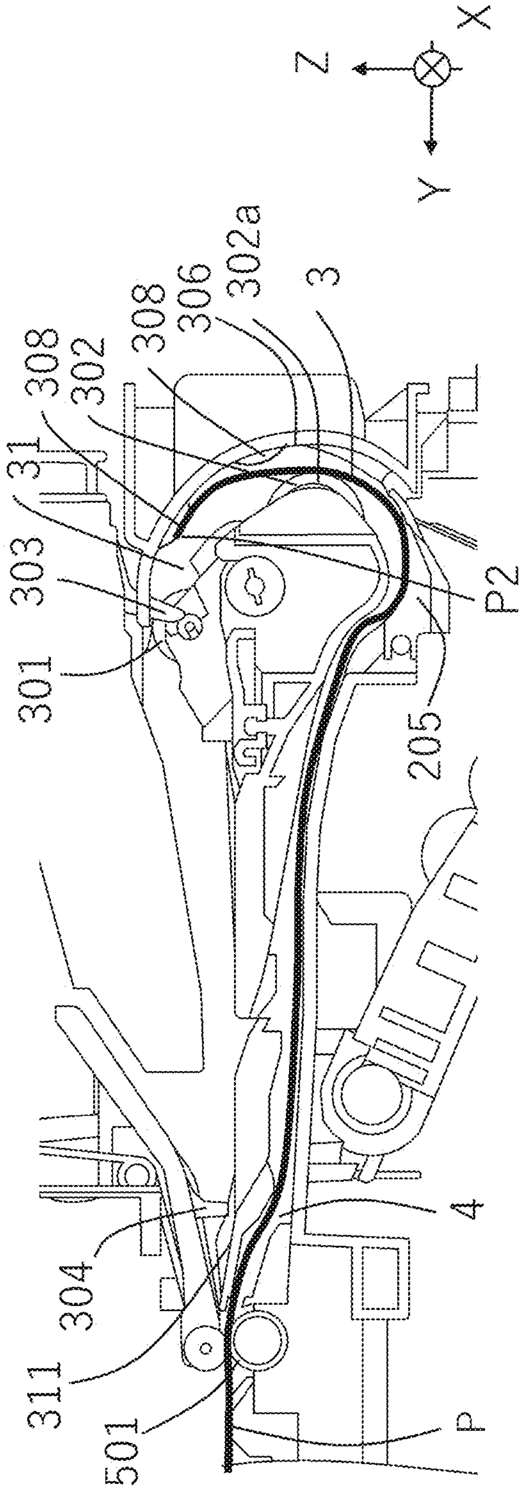
FIG. 6C is a cross-sectional view showing a behavior of the recording medium passing through the double-sided conveyance path.

As shown in FIG. 6C, the recording medium P reaching the conveyance path 3 is conveyed to the pair of intermediate rollers 301 while being guided by the outer inside wall 306 of the conveyance path 3. In the same manner as in the feeding operation for the front side, the recording medium P curving in the curved portion 31 comes into contact with the intermediate roller 302 due to its rigidity and thus obtains a conveying force until it reaches the pair of intermediate rollers 301. This reduces the occurrence of feeding failures even when a recording medium P having high rigidity is conveyed for double-sided printing.

Figure 6D:
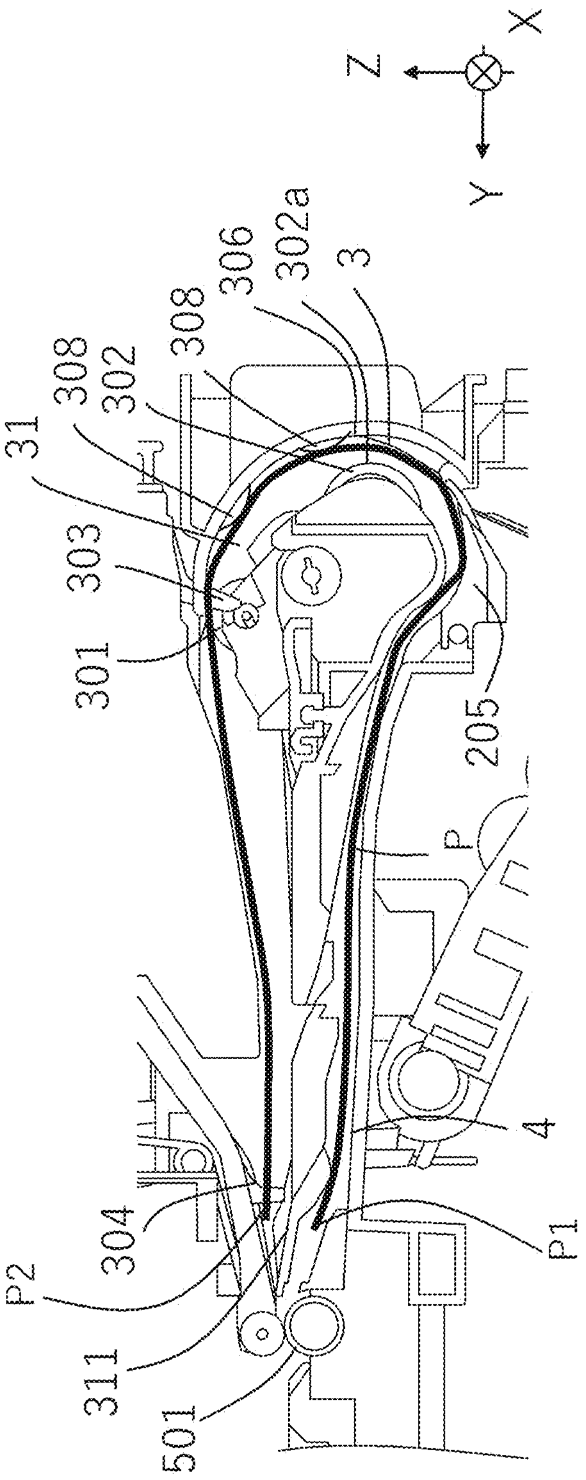
FIG. 6D is a cross-sectional view showing a behavior of the recording medium passing through the double-sided conveyance path.

As shown in FIG. 6D, the recording medium P that is conveyed to the pair of intermediate rollers 301 is thereafter conveyed in the conveyance path 3 mainly by the conveying force of the pair of intermediate rollers 301. After the leading end P2 of the back side (trailing end of the front side) of the recording medium P passes the end detection lever 304, the driving direction of the drive motor 6 is reversed from reverse to forward before the recording medium P reaches the conveying roller 501. The timing of this reversal is after the end detection lever 304 detects that the trailing end P1 of the back side (leading end of the front side) of the recording medium P has passed the conveying roller 501. Then, the leading end P2 of the back side of the recording medium P reaches the conveying roller 501 while pressing down the double-sided flapper 311, and the recording unit 7 performs a recording operation on the back side.

Skew Correction Operation

Figure 7A:
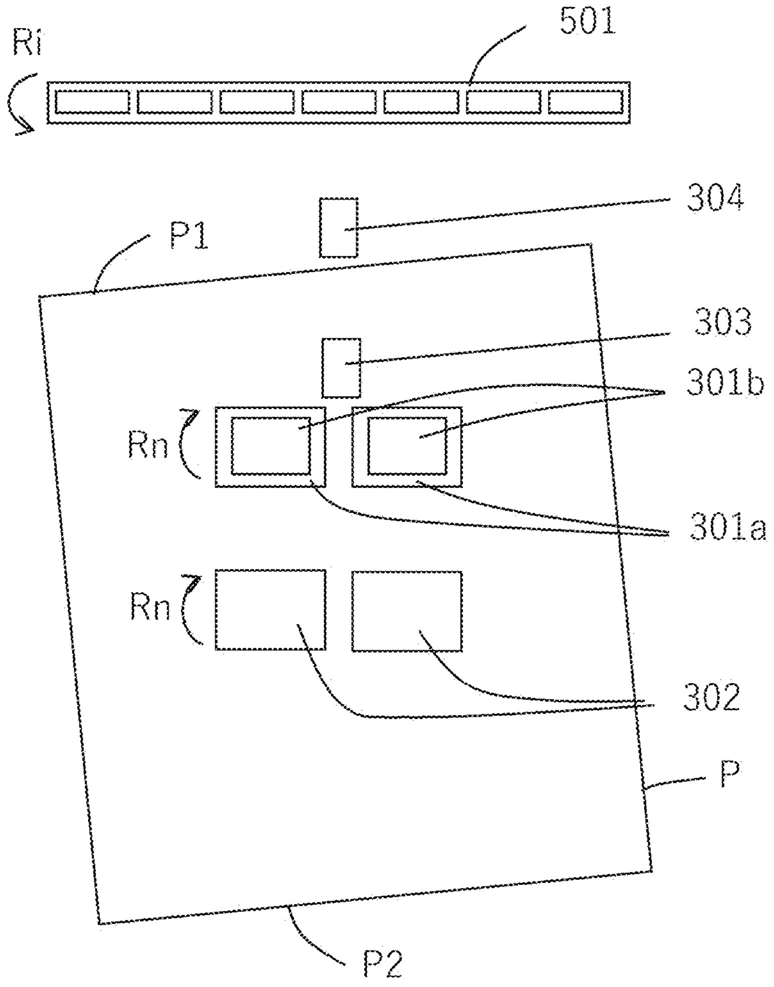
FIG. 7A is a schematic view of the conveyance path as viewed from above the recording apparatus.
Figure 7B:
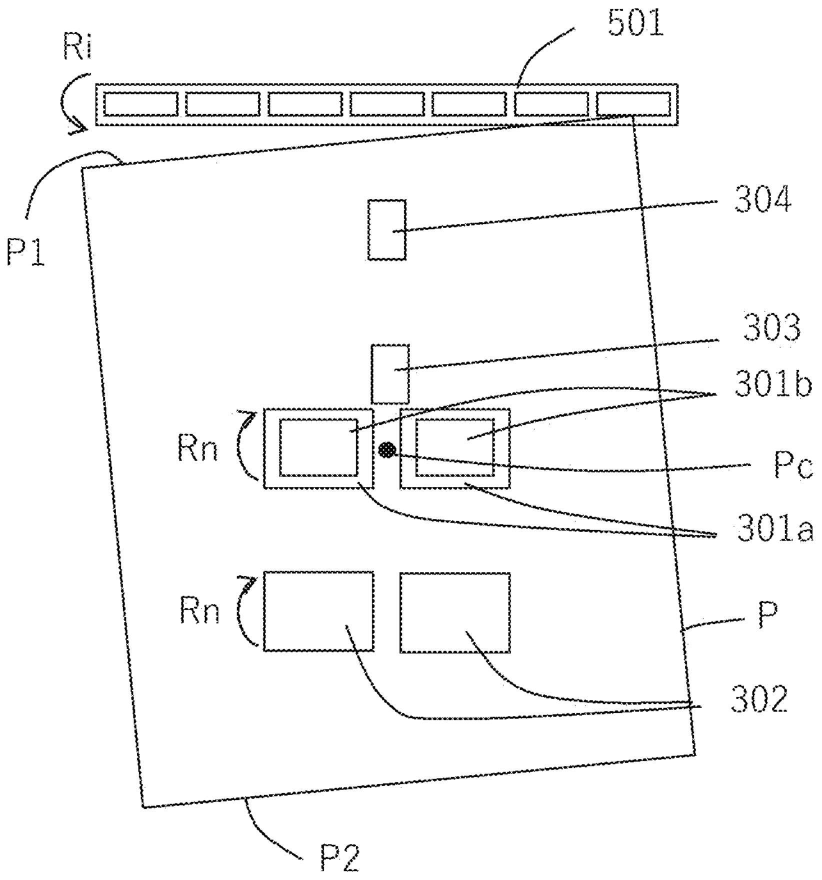
FIG. 7B is a schematic view of the conveyance path as viewed from above the recording apparatus.
Figure 7C:
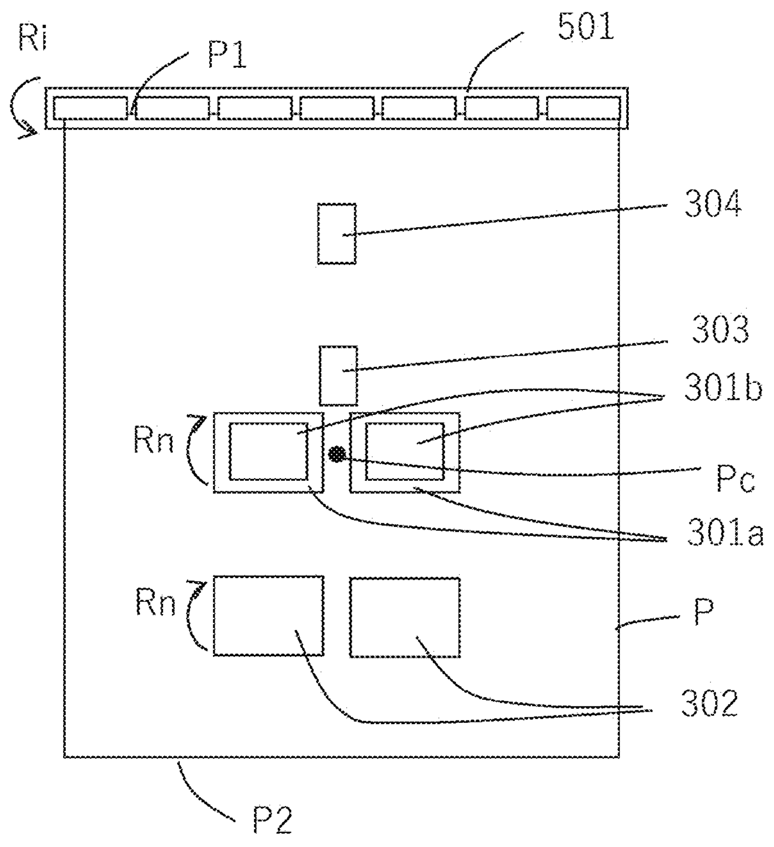
FIG. 7C is a schematic view of the conveyance path as viewed from above the recording apparatus.

FIGS. 7A to 7C are diagrams illustrating the region of the conveyance path 3 from the intermediate roller 302 to the conveying roller 501 as viewed from above (the +Z direction). When a recording medium P reaches the conveying roller 501, the leading end P1 of the recording medium P may be skewed with respect to the conveying roller 501. Such a skew occurs due to the orientation of the recording medium P at the time when it is set in the cassette 200, the difference in resistance between the left and right sides in the conveyance path 3, the difference in diameter between the left and right sides of the pair of intermediate rollers 301 and the intermediate roller 302, and the like. If the recording unit 7 performs a recording operation in this state, the image recorded by the recording unit 7 would be misaligned with the recording medium P in a rotational direction about an axis perpendicular to the recording surface of the recording medium P. To limit this, a skew correction operation is performed before a recording operation so that the leading end P1 of the recording medium P is not skewed with respect to the conveying roller 501.

An example of the skew correction operation is now described. FIG. 7A shows a state before the leading end P1 of a recording medium P reaches the end detection lever 304 after passing the pair of intermediate rollers 301. Once the leading end P1 of the recording medium P reaches the pair of intermediate rollers 301, the recording medium P is then conveyed mainly by the conveying force of the pair of intermediate rollers 301. When the drive motor 6 rotates in the reverse direction, the pair of intermediate rollers 301 and the intermediate roller 302 rotate to convey the recording medium P downstream in the conveying direction (indicated by arrow Rn), whereas the conveying roller 501 rotates to convey the recording medium P upstream in the conveying direction (indicated by arrow Ri).

First, the reverse rotation of the drive motor 6 causes the intermediate rollers 301 to convey the recording medium P downstream in the conveying direction. When the leading end P1 of the recording medium P reaches the end detection lever 304, a controller 802 (see FIG. 8) obtains information on the position of the leading end P1 of the recording medium P.

As the drive motor 6 continues to rotate in the reverse direction, the leading end of the recording medium P reaches the conveying roller 501 as shown in FIG. 7B. Since the conveying roller 501 rotates in the direction that conveys the recording medium P upstream in the conveying direction, the leading end P1 of the recording medium P does not pass the conveying roller 501. That is, the intermediate rollers 301 and the intermediate roller 302 are driven to convey the recording medium toward the recording unit 7. The conveying roller 501 is driven to convey the recording medium in the direction opposite to the conveying direction in which the recording medium is conveyed toward the recording unit 7.

As the drive motor 6 continues to rotate in the reverse direction, the pair of intermediate rollers 301 causes the recording medium P to be pressed against the conveying roller 501. At this time, the leading end P1 of the recording medium P rotates to conform to the conveying roller 501 in accordance with the amount of conveyance caused by pressing, thereby correcting the skew of the recording medium P with respect to the conveying roller 501. At this time, the recording medium P is nipped only by the pair of intermediate rollers 301, and the intermediate roller 302 is merely in contact with the recording medium P. As such, the skew correction operation is performed such that the recording medium P rotates about the center Pc of the recording medium P located at the position of the pair of intermediate rollers 301, and the intermediate roller 302 rarely interferes with the movement of the recording medium P. The intermediate roller 302, the pair of intermediate rollers 301, the conveying roller 501, and the controller 802 which controls them to drive as described above, correct the skew by rotating (moving) the recording medium P about an axis perpendicular to the recording surface (warping the recording medium P in a perpendicular direction).

Subsequently, the drive motor 6 rotates forward, causing the conveying roller 501 and the pair of intermediate rollers 301 to convey the recording medium P downstream in the conveying direction. The recording medium P is thus conveyed to the recording unit 7 with the skew corrected, as shown in FIG. 7C.

As for a long recording medium P, the trailing end P2 of the recording medium P may be still in the feeding unit 2 when the leading end P1 of the recording medium P reaches the conveying roller 501 and in a condition for skew correction operation. In this case, a skew correction operation is performed in the state as shown in FIG. 5D. At this time, the recording medium P is in contact with the intermediate roller 302 due to its rigidity, and therefore receives resistance from the intermediate roller 302 against the rotation in the skew correction operation. However, the resistance against the rotation in the skew correction operation is small because no other location of the recording medium P is nipped with a nip pressure by a roller pair other than the pair of intermediate rollers 301.

Figure 5E:
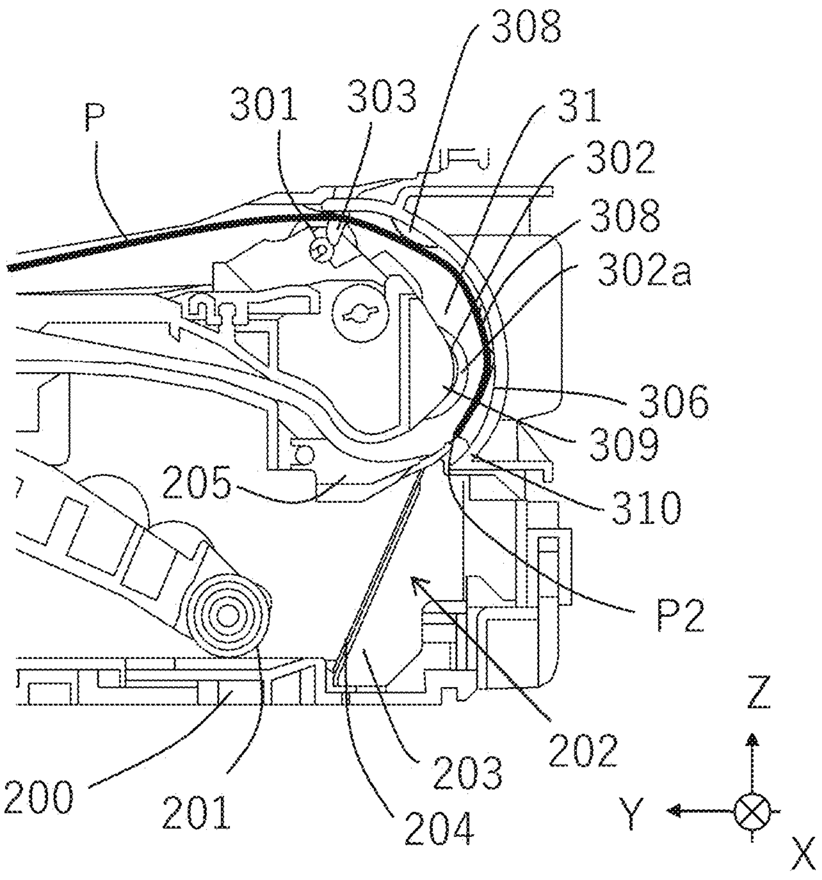
FIG. 5E is a cross-sectional view showing a behavior of the recording medium passing through the conveyance path.

As for a short recording medium P, the trailing end P2 of the recording medium P may be out of the feeding unit 2 when the leading end P1 of the recording medium P reaches the conveying roller 501 and in a condition for skew correction operation. In this case, a skew correction operation is performed in the state as shown in FIG. 5E. At this time, the trailing end P2 of the recording medium P is oriented along the outer inside wall 306 of the conveyance path 3 due to the rigidity of the recording medium P. In this case, the recording medium P is separated from the intermediate roller 302 and does not receive resistance from the intermediate roller 302 against the rotation in the skew correction operation.

The skew correction operation is not limited to the above-described method of pressing the leading end P1 of the recording medium P against the conveying roller 501 rotating in the reverse direction. For example, the leading end P1 of the recording medium P may be pressed against the conveying roller 501 in a stopped state. Alternatively, the drive motor 6 may be rotated in the forward direction to convey the recording medium P until the leading end P1 passes the conveying roller 501, and then the drive motor 6 may be rotated in the reverse direction. As a result, the leading end P1 of the recording medium P is pulled to the conveying roller 501, allowing the leading end P1 of the recording medium P to conform to the conveying roller 501.

Control Configuration

Figure 8:
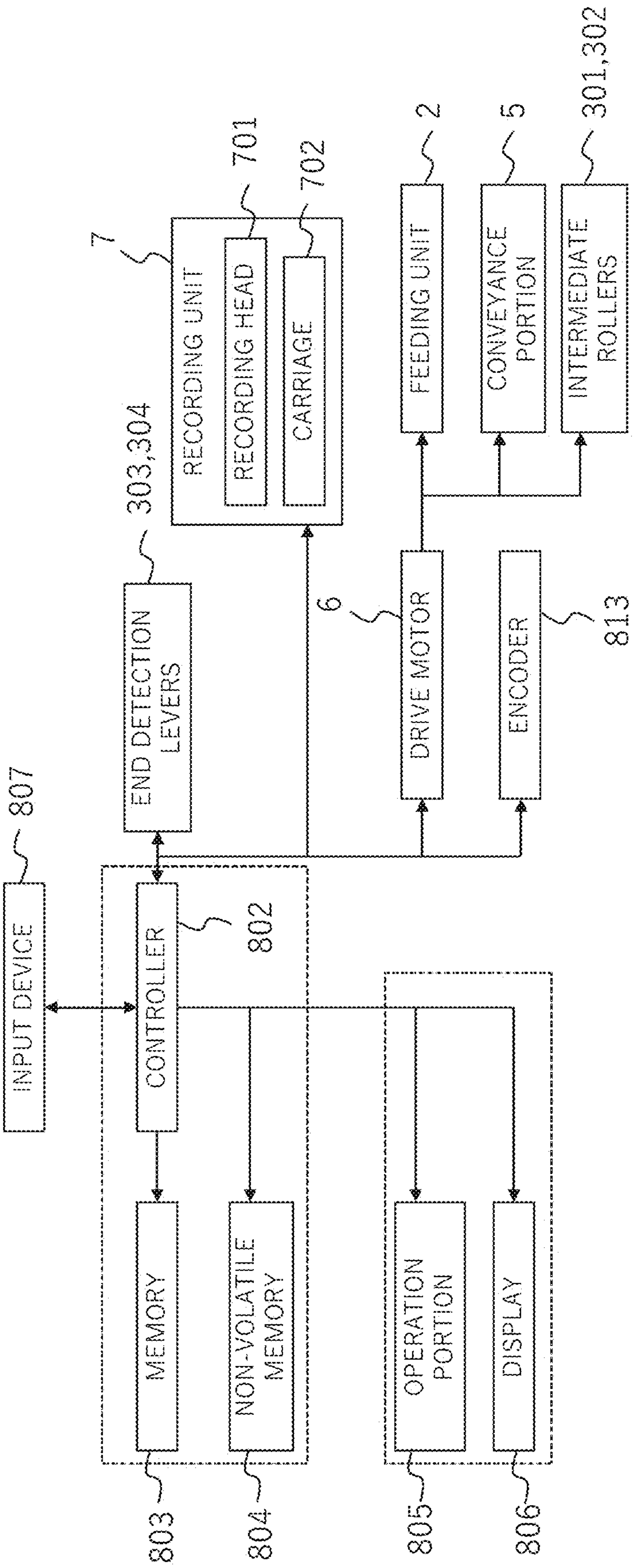
FIG. 8 is a functional block diagram of the recording apparatus.

FIG. 8 is a functional block diagram of the recording apparatus 1. The controller 802 comprehensively controls the recording apparatus 1. The controller 802 is composed of a central processing unit (CPU). A memory 803 includes read-only memory (ROM), random-access memory (RAM), and the like. The ROM stores various programs. The RAM provides a system work memory for the CPU to operate, and is also used to temporarily store various data. The CPU reads out a program stored in the ROM into the RAM and executes it, thereby realizing various functions of the recording apparatus 1. A non-volatile memory 804 may be a hard disk drive (HDD), for example, and stores various programs, data, and the like.

An operation portion 805 receives operation input by the user. The operation portion 805 may include a touch panel and a keyboard. The controller 802 controls the operation of the recording apparatus 1 in accordance with the content of operation of the operation portion 805 by the user, that is, the instruction content. The controller 802 can receive instructions regarding the operation of the recording apparatus 1 from an input device 807 such as a PC or a smartphone. Furthermore, a display 806 displays various types of information.

The controller 802 obtains the detection results of the end detection levers 303 and 304 and an encoder 813, and controls the drive motor 6 and the recording unit 7 based on these detection results. The operation of the drive motor 6 is controlled by the controller 802, causing the various rollers and the like in the feeding unit 2 and the conveyance portion 5 to be driven. The encoder 813 detects the drive amount of the drive motor 6. The drive amount of the drive motor 6 is detected by the encoder 813, and the speed and drive amount of the drive motor 6 are controlled by performing various controls such as PID control.

Outline of Feeding and Skew Correction Operation

Figure 9:
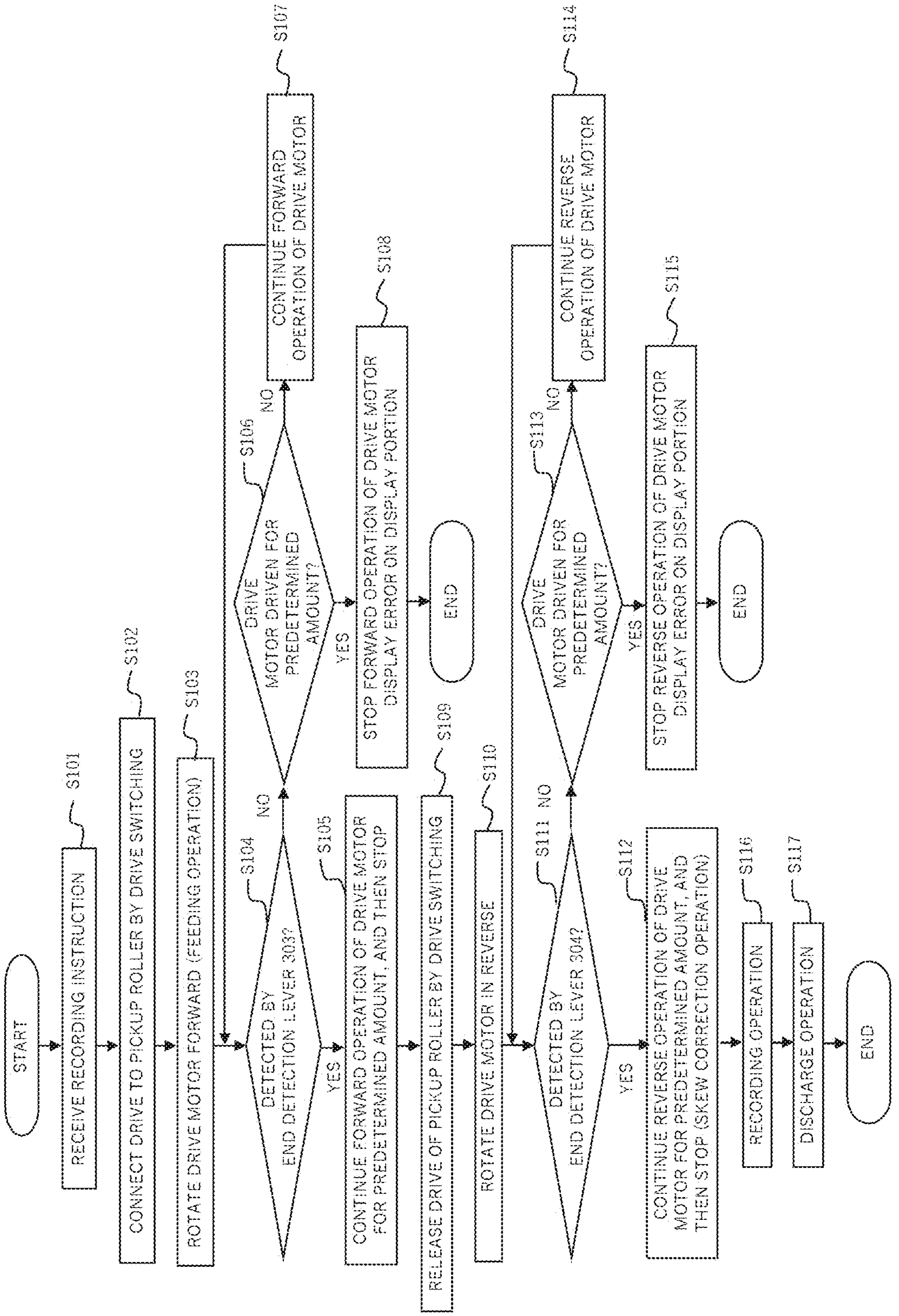
FIG. 9 is a flowchart showing operation of the recording apparatus.

FIG. 9 is a flowchart showing feeding and skew correction operation in the recording apparatus 1.

At step S101, the controller 802 receives a recording instruction. The controller 802 receives a recording instruction from the user via the operation portion 805 or the input device 807.

At step S102, the controller 802 performs a drive switching operation. The controller 802 controls a drive switching portion (not shown) to connect the drive of the drive motor 6 to the pickup roller 201.

At step S103, the controller 802 rotates the drive motor 6 in the forward direction. This drives the pickup roller 201, the pair of intermediate rollers 301, and the intermediate roller 302 to convey the recording medium P downstream in the conveying direction. Of the recording media P stacked in the cassette 200, the uppermost recording medium P is fed to the conveyance path 3.

At step S104, the controller 802 determines whether the end detection lever 303 has detected the leading end P1 of the recording medium P. If it is detected (YES at step S104), the controller 802 performs step S105. If it is not detected (NO at step S104), the controller 802 performs step S106.

At step S105, the controller 802 continues the forward rotation of the drive motor 6 for a predetermined amount, and then stops the drive motor 6. The predetermined amount by which the drive motor 6 is rotated in the forward direction is determined on the basis of the conveyance amount required for the leading end P1 of the recording medium P to be securely nipped between the pair of intermediate rollers 301. This allows the driving of the pair of intermediate rollers 301 alone to convey the recording medium P even if the pickup roller 201 is stopped. Depending on the length of the recording medium P, if the amount of forward rotation of the drive motor 6 after detection by the end detection lever 303 is too large, the trailing end P2 of the recording medium P would leave the pickup roller 201, causing the next recording medium stacked in the cassette 200 to be fed. For this reason, the amount of forward rotation of the drive motor 6 after detection by the end detection lever 303 is set to an appropriate drive amount that is not too large. Following step S105, the controller 802 performs step S109.

At step S106, the controller 802 determines whether the drive motor 6 has been driven a predetermined amount. If the drive amount of the drive motor 6 has reached the predetermined amount (YES at step S106), the controller 802 performs step S108. If the drive amount has not reached the predetermined amount (NO at step S107), the controller 802 performs step S107.

At step S107, the controller 802 continues to drive the drive motor 6 in the forward direction, and performs determination at step S104.

At step S108, the controller 802 stops the operation of the drive motor 6 and displays an error on the display 806. Examples of the error content to be displayed include out-of-paper error and paper jam error.

At step S109, the controller 802 performs a drive switching operation to release the drive connection between the drive motor 6 and the pickup roller 201. As a result, in the subsequent feeding and recording operations, the recording medium P stacked in the cassette 200 is not fed. The drive switching operation may be performed simultaneously with a skew correction operation.

At step S110, the controller 802 drives the drive motor 6 in the reverse direction. This drives the pair of intermediate rollers 301 and the intermediate roller 302 to convey the recording medium P downstream in the conveying direction, and drives the conveying roller 501 to convey the recording medium P upstream in the conveying direction.

At step S111, the controller 802 determines whether the end detection lever 304 has detected the leading end P1 of the recording medium P. If it is detected (YES at step S111), the controller 802 performs step S112. If it is not detected (NO at step S111), the controller 802 performs step S113.

At step S112, the controller 802 continues the reverse rotation of the drive motor 6 for a predetermined amount, and then stops the drive motor 6. As a result, the leading end P1 of the recording medium P being conveyed downstream in the conveying direction by the pair of intermediate rollers 301 is pressed toward the conveying roller 501 driven in the reverse direction, and a skew correction operation is performed. The predetermined amount by which the drive motor 6 is reversed is determined based on the sum of the drive amount required for the leading end P1 of the recording medium P to reach the conveying roller 501 and the drive amount required to properly correct the skew by pressing the recording medium P toward the conveying roller 501. When the amount of pressing toward the conveying roller 501 is too small, the skew correction operation cannot be performed sufficiently. When the amount of pressing is too large, the recording medium P may be wrinkled, or the leading end P1 may be damaged. The amount of pressing required for the skew correction operation is set according to conditions such as the type of recording medium P and the environment in which the recording apparatus 1 is used.

At step S113, the controller 802 determines whether the drive motor 6 has been driven a predetermined amount. If the drive amount of the drive motor 6 has reached the predetermined amount (YES at step S113), the controller 802 performs step S115. If the drive amount has not reached the predetermined amount (NO step S113), the controller 802 performs step S114.

At step S114, the controller 802 continues to drive the drive motor 6 in the reverse direction, and performs determination at step S111.

At step S115, the controller 802 stops the operation of the drive motor 6 and displays an error on the display 806. Examples of the error content to be displayed include out-of-paper error and paper jam error.

At step S116, the controller 802 causes the recording unit 7 to perform a recording operation on the recording medium P on which the skew correction operation has been performed. The recording head 71 performs a one-pass recording operation while moving in the width direction of the recording medium P.

At step S117, the controller 802 performs a discharge operation. The controller 802 drives the discharge roller 502 by the drive motor 6 to discharge the recording medium P after recording onto the discharge tray 801. The controller 802 then ends the recording operation.

The flowchart of FIG. 9 shows the flow of the recording operation for one recording medium P. When the printing job includes printing on multiple printing media P, the controller 802 repeatedly performs the process of this flowchart until printing on all of the printing media P is completed.

Upon detecting any abnormality through the end detection lever 303, the end detection lever 304, the encoder 813, and the like while performing the process of the flowchart of FIG. 9, the controller 802 stops driving the drive motor 6 and displays an error or instructions to the user on the display 806. Examples of the error contents include paper jam error, out-of-paper error, and out-of-ink error.

According to the recording apparatus 1 of the first embodiment, when the recording medium P is conveyed in the curved portion 31 of the conveyance path 3, the conveying force by the pair of intermediate rollers 301 and the conveying force by the intermediate roller 302 provide a conveying force sufficient to limit conveyance failures even for a recording medium P made of a highly rigid material. The conveying force of the intermediate roller 302 is not obtained by nipping the recording medium P between the intermediate roller 302 and a member facing it. Rather, it is obtained by the recording medium P coming into contact with the single intermediate roller 302. As such, the section that applies a conveying force by nipping the recording medium Pis only one section of the pair of intermediate rollers 301, reducing the likelihood of the skew correction operation being hindered. In this manner, according to the recording apparatus 1 of the first embodiment, it is possible to achieve both appropriate skew correction and reduced conveyance failures with a simple configuration.

A configuration in which the pair of intermediate rollers 301 is provided downstream of the curved portion 31 has been illustrated in the first embodiment. However, depending on the configuration of the conveyance path 3, it is also possible to configure the pair of intermediate rollers to be provided upstream of the curved portion 31. The first embodiment may also be considered as a conveying apparatus that includes the conveyance path 3 including the curved portion 31, conveys a recording medium P by applying conveying forces by the pair of intermediate rollers 301, the intermediate roller 302, and the conveying roller 501, and corrects a skew.

According to the present invention, in a recording apparatus having a recording medium conveyance path that is partly curved, it is possible to achieve both appropriate skew correction and reduced conveyance failures with a simple configuration.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-122656, filed on Jul. 27, 2023, which is hereby incorporated by reference herein in its entirety.

What is claimed is:

1. A recording apparatus comprising:

a feeding unit configured to feed a recording medium;

a recording unit configured to record an image on the recording medium;

a conveyance path including a U-shaped curved portion formed by an inner inside wall and an outer inside wall spaced apart from the inner inside wall in a horizontal direction, the conveyance path being configured to guide the recording medium fed by the feeding unit to the recording unit;

a first driving roller provided in the conveyance path and configured to nip the recording medium together with a first driven roller;

a motor configured to drive the first driving roller;

a second driving roller provided on the inner inside wall of the curved portion upstream of the first driving roller with respect to a conveying direction and configured to be driven by the motor; and a second driven roller that faces the second driving roller and does not contact the second driving roller, wherein the second driving roller faces the outer inside wall in the horizontal direction with a gap between the second driving roller and the outer inside wall, and an end portion in the horizontal direction of an outer circumference surface of the second driving roller is closer to the outer inside wall than an end portion in the horizontal direction of the inner inside wall is to the outer inside wall, and wherein the second driven roller is located downstream in the conveying direction of a position of the outer inside wall facing the second driving roller.

2. The recording apparatus according to claim 1, wherein the second driving roller is provided at the end portion in the horizontal direction of the inner inside wall.

3. The recording apparatus according to claim 1, further comprising:

a storage for storing a recording medium, wherein the curved portion is located above the storage, an upstream end of the curved portion in the conveying direction and the storage are connected by a slope inclined along the horizontal direction, and at least a part of the second driving roller is located on a side near the outer inside wall in the horizontal direction with respect to an imaginary plane that is an imaginary extension of the slope to an inside of the curved portion.

4. The recording apparatus according to claim 1, wherein the first driving roller is provided downstream of the curved portion in the conveying direction.

5. The recording apparatus according to claim 1, further comprising:

a third driving roller provided downstream of the first driving roller in the conveyance path and configured to nip the recording medium together with a third driven roller, wherein a skew of a recording medium is corrected by driving the first driving roller and the second driving roller to convey the recording medium in the conveying direction, and by stopping the third driving roller or driving the third driving roller to convey the recording medium in a direction opposite to the conveying direction.

6. The recording apparatus according to claim 1, further comprising:

a second conveyance path for conveying the recording medium, on which recording on a front side thereof is completed by the recording unit, so as to perform recording on a back side of the recording medium, wherein the second conveyance path is connected to an upstream side of the second driving roller in the curved portion.

7. The recording apparatus according to claim 1, wherein a distance between the outer circumference surface of the second driving roller and the outer inside wall at a position facing the second driving roller is less than a distance between the inner inside wall and the outer inside wall.

8. A conveying apparatus conveying a recording medium, the conveying apparatus comprising:

a conveyance path including a U-shaped curved portion formed by an inner inside wall and an outer inside wall spaced apart from the inner inside wall in a horizontal direction, the conveyance path being configured to guide the recording medium;

first driving roller provided in the conveyance path and configured to nip the recording medium together with a first driven roller;

a motor configured to drive the first driving roller;

a second driving roller located at the inner inside wall of the curved portion upstream of the first driving roller with respect to a conveying direction and configured to be driven by the motor; and a second driven roller that faces the second driving roller and does not contact the second driving roller, wherein the second driving roller faces the outer inside wall in the horizontal direction with a gap between the second driving roller and the outer inside wall, and an end portion in the horizontal direction of an outer circumference surface of the second driving roller is closer to the outer inside wall than an end portion in the horizontal direction of the inner inside wall is to the outer inside wall, and wherein the second driven roller is located downstream in the conveying direction of a position of the outer inside wall facing the second driving roller.

9. The recording apparatus according to claim 1, wherein a plurality of second driving rollers are arranged in a width direction of the inner inside wall.

10. The recording apparatus according to claim 1, wherein the second driving roller is located immediately downstream of the feeding unit in the conveyance path.

11. The recording apparatus according to claim 1, further comprising a gear train configured to transmit driving force of the motor to the second driving roller.

* * * * *